United States Patent Office 3,767,715
Patented Oct. 23, 1973

3,767,715
METHOD FOR PREPARING BERYLLIUM COMPOUNDS
John A. Snover, Beverly Farms, and Richard D. Donovan, Peabody, Mass., assignors to Metal Hydrides Incorporated, Beverly, Mass.
No Drawing. Filed July 26, 1962, Ser. No. 214,445
Int. Cl. C07f 3/00
U.S. Cl. 260—665 R    30 Claims This invention relates to the preparation of organo beryllium compounds and lithium beryllium organo compounds.

Certain butyl beryllium compounds, such as bis-isobutyl beryllium and bis-tertiary butyl beryllium, have been prepared utilizing the Grignard reaction. Thus, isobutyl bromide may be added slowly to magnesium in dry ether followed by slowly adding thereto a solution of beryllium chloride in diethyl ether. After stirring the mixture for several hours and removing the ether solvent, the isobutyl beryllium is recovered by vacuum distillation at a temperature between 60° and 70° C.

The above method is not suitable for the preparation of bis-n-butyl beryllium because bis-n-butyl beryllium is much less volatile than bis-tertiary butyl beryllium or bis-isobutyl beryllium. Thus, heating bis-n-butyl beryllium under a diffusion pump vacuum of $10^{-3}$ mm. of mercury does not give any significant amount of distillate at temperatures up to 120° C. Above 100° C. pyrolysis begins and is rapid above 120° C.

During our investigations attempts were made to prepare bis-n-butyl beryllium by reacting beryllium chloride in solution in diethyl ether with n-butyl lithium in solution in a hydrocarbon solvent, such as heptane or hexane, in an ice bath or at room temperature, the precipitated lithium chloride being removed by filtration. It was found that when beryllium chloride is dissolved in ether considerable heat is evolved and there is some coloration of the resulting solution. This coloration persists and intensifies when this solution is added to the n-butyl lithium solution. Furthermore, the reaction is difficult to control and an incomplete reaction results. The filtrate obtained by removing the precipitated lithium chloride contains significant amounts of impurities.

We have discovered that these difficulties can be overcome by first slurrying the beryllium chloride in the hydrocarbon solution of n-butyl lithium and then slowly adding to the slurry an amount of diethyl ether at least sufficient to dissolve the beryllium chloride. We have obtained good results by adding the ether at a rate such that the temperature of the reaction mixture does not substantially exceed normal room temperature. If desired, the reaction vessel may be cooled with cold water. The filtrate obtained by removing the precipitated lithium chloride is water-white.

We have further discovered that any of a plurality of products may be produced by the practice of the invention, each conforming to the formula $Li_xBeBu_{2+x}$ where $x$ is a number from zero to one and Bu is n-butyl. Thus, when n-butyl lithium and the beryllium halide are used in the molar ratio of about 2 moles of n-butyl lithium for each mole of beryllium halide, the product produced is bis-n-butyl beryllium, the reaction being illustrated by the equation:

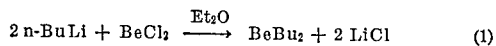   (1)

When about 3 moles of n-butyl lithium are used for each mole of beryllium halide, the product produced is lithium beryllium butyl, the reaction being illustrated by the equation:

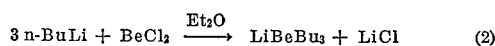   (2)

While the method of the invention is particularly suitable for the preparation of bis-n-butyl berylluim and lithium beryllium-n-butyl, it is broadly applicable for the preparation of beryllium compounds conforming to the formula $Li_xBeR_{2+x}$ where $x$ is a number from zero to one and R is a hydrocarbon radical which forms compounds conforming to the formula RLi which are soluble in liquid hydrocarbons. Thus, n-butyl lithium in the reactions illustrated by Equations 1 and 2 above may be replaced by other compounds having the formula RLi which are soluble in liquid hydrocarbons to form compounds conforming to the formulas $R_2Be$ and $LiBeR_3$. As illustrative of other hydrocarbon radicals which can replace n-butyl in the reactions illustrated by Equations 1 and 2 above we may mention ethyl, n-propyl, isopropyl, secondary butyl, isobutyl, tertiary butyl, n-pentyl, n-hexyl, n-heptyl, n-octyl, stearyl, 1,1-diphenyl hexyl, 1-phenyl-2-butenyl, 1-phenyl-1-methyl ethyl, 3-methyl-2-butenyl, cyclopentyl, cyclohexyl, secondary pentyl, tertiary pentyl, primary and secondary isopentyl, 1-phenyl-3,3-dimethyl butyl, and 2,4-cyclohexadienyl.

In the practice of the method of the invention, other beryllium halides, such as the bromide or iodide, may be used in place of beryllium chloride. Also, diethyl ether may be replaced by other ether solvents for the beryllium halide, such as dipropyl ether, propyl methyl ether, dibutyl ether, tetrahydrofuran, tetrahydropyran, and the dimethyl ethers of ethylene glycol and diethylene glycol.

The compounds having the formula RLi used in the practice of the invention may be prepared by reacting lithium metal with compounds having the formula RBr in a liquid hydrocarbon, such as hexane, as illustrated by the equation:

   (3)

The compounds conforming to the formula $Li_xBeR_{2+x}$ are useful as intermediates in the preparation of other beryllium compounds. Thus, beryllium hydride may be prepared by the pyrolysis of the $R_2Be$ compounds by slowly adding the $R_2Be$ compound to an inert high-boiling liquid hydrocarbon, such as dodecane, heated to a temperature between about 120° C. and 215° C. the beryllium hydride being precipitated in the liquor. Lithium beryllium hydride may be prepared by slowly adding a concentrated solution of lithium aluminum hydride in diethyl ether to a concentrated solution of the $LiBeR_3$ compounds in a liquid hydrocarbon, the reaction being illustrated by the equation:

   (4)

The invention is illustrated further by the following specific examples.

EXAMPLE 1

To a slurry of 16.0 grams of 99% beryllium chloride in 360 ml. of a hexane solution containing 38.4 grams of n-butyl lithium was added dropwise 200 ml. of anhydrous diethyl ether. The temperature was maintained below room temperature by means of a cold water bath around the outside of the reaction flask. The mixture was stirred for two hours and then the precipitated lithium chloride was filtered off under a dry nitrogen atmosphere.

The clear filtrate was concentrated by removal of the ether and hexane solvents under vacuum. To this concentrated solution of lithium beryllium-n-butyl was added dropwise a 5.1 molar ether solution containing 7.6 grams of lithium aluminum hydride. Heat was evolved and a fine white precipitate was formed. After the addition was completed, which consumed 2 hours, the mixture was stirred overnight at room temperature.

Filtration of the precipitated product under dry nitrogen pressure and washing with four 50 ml. portions of hexane gave 3.3 grams of a fine white solid which analyzed: 14.46% hydrogen (by hydrolysis), 33.1% beryllium, 53.8% lithium, 0.11% aluminum, and 2.15% carbon (by combustion), the mole ratio being almost exactly $Li_2BeH_4$ and the purity being 96% based on the hydride analysis.

EXAMPLE 2

An oil dispersion containing 7.0 grams of lithium metal was reacted with 55 grams of isobutyl bromide in 400 ml. of hexane. After the reaction was completed, the precipitated lithium bromide and excess lithium metal were filtered off leaving a hexane solution of isobutyl lithium. To this was added 16.0 grams of 99% beryllium chloride. The mixture was stirred rapidly and cooled as 200 ml. of dry diethyl ether was added in two hours. The precipitated lithium chloride was removed by filtration.

The ether-hexane solution containing the bis-isobutyl beryllium was pyrolyzed by adding it over a two hour period to a stirred solution of dodecane at 180° C. The light gray solid, which was filtered off, washed with hexane and dried in vacuum contained 50 percent by weight of beryllium hydride.

EXAMPLE 3

A hexane solution containing 12.8 grams of n-butyl lithium was added to a flask containing 16.0 grams of 99% beryllium chloride. The mixture was stirred under a dry nitrogen atmosphere and cooled as 200 ml. of dry diethyl ether was added dropwise. After the addition was completed, the mixture was stirred for an additional two hours. The lithium chloride was filtered off under dry nitrogen pressure and the resulting clear filtrate was pyrolyzed by adding it over a period of two hours to 300 ml. of dodecane at 180° C. After heating for another hour at 180° C., the white granular solids were filtered off while hot, washed with five 100 ml. portions of hexane, and dried in vacuum at 60° C. There was obtained 2.1 grams of product which analyzed 14.46% hydrogen by hydrolysis, 66.8% beryllium, and 1.05% lithium. The hydrode to beryllium ratio is 1.94 and the purity, based on the hydrogen value, is 79.5 weight percent beryllium hydride.

We claim:

1. The method for preparing a compound conforming to the formula $Li_xBeR_{2+x}$ where $x$ is a number from zero to one and R is a hydrocarbon radical which comprises forming a suspension of a beryllium halide in a liquid hydrocarbon solution of a compound conforming to the formula RLi in which the compound RLi and beryllium halide are present in the molar ratio between about 2 to about 3 moles of the compound RLi for each mole of beryllium halide, and adding to said suspension as ether which is a solvent for the beryllium halide at a rate such that the temperature of the reaction mixture does not substantially exceed normal room temperature, thereby forming a solution of a compound conforming to the formula $Li_xBeR_{2+x}$ in the mixture of liquid hydrocarbon and ether containing precipitated lithium halide, the amount of ether used being at least equal to that required to dissolve the amount of beryllium halide used, said halide being selected from the group consisting of chloride, bromide and iodide.

2. The method as claimed by claim 1 wherein the compound RLi and beryllium halide are present in the molar ratio of about 2 moles of the compound RLi for each mole of beryllium halide.

3. The method as claimed by claim 1 wherein the compound RLi and beryllium halide are present in the molar ratio of about 3 moles of the compound RLi for each mole of beryllium halide.

4. The method as claimed by claim 2 wherein R is an alkyl radical.

5. The method as claimed by claim 2 where R is isobutyl.

6. The method as claimed by claim 2 where R is secondary butyl.

7. The method as claimed by claim 2 where R is tertiary butyl.

8. The method as claimed by claim 2 wherein R is n-butyl.

9. The method as claimed by claim 3 wherein R is an alkyl radical.

10. The method as claimed by claim 3 where R is isobutyl.

11. The method as claimed by claim 3 wherein R is secondary butyl.

12. The method as claimed by claim 3 where R is tertiary butyl.

13. The method as claimed by claim 3 wherein R is n-butyl.

14. The method as claimed by claim 5 wherein the ether is diethyl ether.

15. The method as claimed by claim 6 wherein the ether is diethyl ether.

16. The method as claimed by claim 7 wherein the ether is diethyl ether.

17. The method as claimed by claim 8 wherein the ether is diethyl ether.

18. The method as claimed by claim 10 wherein the ether is diethyl ether.

19. The method as claimed by claim 11 wherein the ether is diethyl ether.

20. The method as claimed by claim 12 wherein the ether is diethyl ether.

21. The method as claimed by claim 13 wherein the ether is diethyl ether.

22. The method as claimed by claim 14 wherein the halide is beryllium chloride.

23. The method as claimed by claim 15 wherein the halide is beryllium chloride.

24. The method as claimed by claim 16 wherein the halide is beryllium chloride.

25. The method as claimed by claim 17 wherein the halide is beryllium chloride.

26. The method as claimed by claim 18 wherein the halide is beryllium chloride.

27. The method as claimed by claim 19 wherein the halide is beryllium chloride.

28. The method as claimed by claim 20 wherein the halide is beryllium chloride.

29. The method as claimed by claim 21 wherein the halide is beryllium chloride.

30. The method for preparing a compound conforming to the formula $Li_xBeR_{2+x}$ where $x$ is a number from zero to one and R is a hydrocarbon radical selected from the group consisting of ethyl, n-propyl, isopropyl, n-butyl, secondary butyl, isobutyl, tertiary butyl, n-pentyl, n-hexyl, n-heptyl, n-octyl, stearyl, 1,1-diphenyl hexyl, 1-phenyl-2-butenyl, 1-phenyl - 1 - methyl ethyl, 3-methyl-2-butenyl, cyclopentyl, cyclohexyl, secondary pentyl, tertiary pentyl, primary isopentyl, secondary isopentyl, 1-phenyl-3, 3-dimethyl butyl, and 2,4-cyclohexadienyl, said method comprising forming a suspension of a beryllium halide in a liquid hydrocarbon solution of a compound conforming to the formula RLi in which the compound RLi and beryllium halide are present in the molar ratio between about 2 to about 3 moles of the compound RLi for each mole of beryllium halide, and adding to said suspension an ether which is a solvent for the beryllium halide at a rate such that the temperature of the reaction mixture does not substantially exceed normal room temperature, thereby forming a solution of a compound conforming to the formula $Li_xBeR_{2+x}$ in the mixture of liquid hydrocarbon and ether containing precpitated lithium halide, the amount of ether used being at least equal to that required to dissolve the amount of beryllium halide used, said halide being selected from the group consisting of chloride, bromide and iodide.

References Cited

Wood et al.: J. Electro Chem. Soc., vol. 104, pp. 29–37 (1957).

LELAND A. SEBASTIAN, Primary Examiner